G. V. SCOTT.
Heel-Lift Holders.
No. 153,786. Patented Aug. 4, 1874.
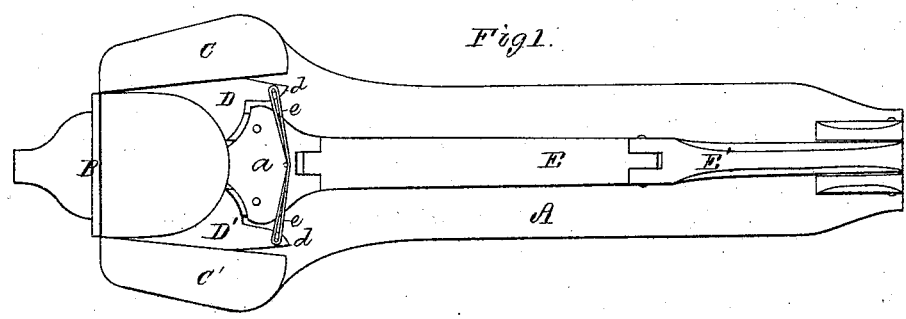
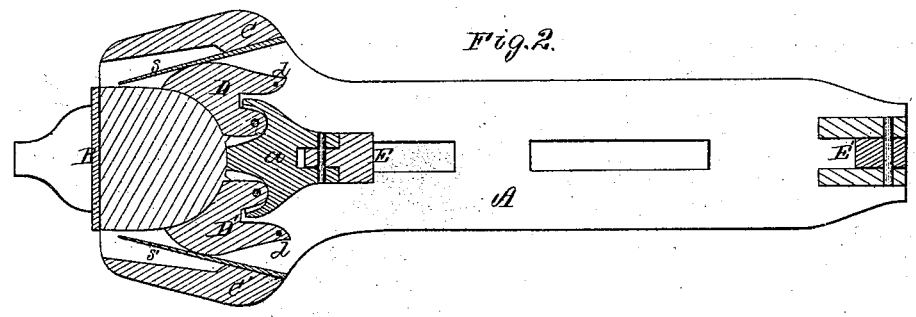
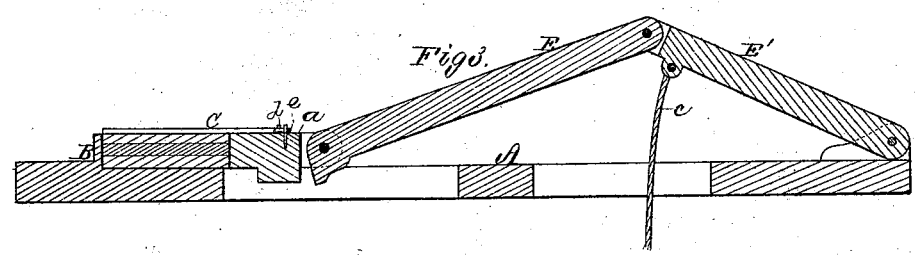
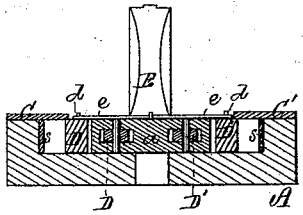
Witnesses.
S. N. Piper
J. R. Snow
George V. Scott.
by his attorney
R. H. Eddy

UNITED STATES PATENT OFFICE.

GEORGE V. SCOTT, OF CAMPELLO, MASSACHUSETTS.

IMPROVEMENT IN HEEL-LIFT HOLDERS.

Specification forming part of Letters Patent No. 153,786, dated August 4, 1874; application filed February 21, 1874.

*To all whom it may concern:*

Be it known that I, GEORGE V. SCOTT, of Campello, of the county of Plymouth and State of Massachusetts, have invented a new and useful Heel-Lift Holder; and do hereby declare the same to be fully described in the following specification and represented in the accompanying drawings, of which—

Figure 1 is a top view, Fig. 2 a horizontal section, Fig. 3 a longitudinal and vertical section, and Fig. 4 a transverse and vertical section, of it.

The article or machine is for adjusting and supporting a series of lifts composing or to compose a shoe or boot heel, and to do this while they are being nailed together. It is also for effecting the clinching of the nails used in connecting such lifts.

In the drawings, A denotes a bed-plate formed near its front end with an abutment, B, and with two convergent lips or guides, C C', arranged and formed as shown. Springs S S' are fixed to the inner surfaces of the guides C C', and disposed therewith, as represented. Between and resting against the said springs, and overlapped by the guides, is a pair of lever jaws, D D'. They are pivoted to a head, a, which, in turn, is hinged to the front one of two toggles, E E'. The rear toggle, at its rear end, is pivoted to the bed-plate, which, below the toggles, is slotted, as represented, a rope, c, connected with one of the toggles, going down through one of the slots. Each of the jaws D D' has its tail d connected with the head a by a spring, e, the purpose of the two springs e e being to open the jaws or draw them asunder when the head a is retreating or being drawn back by the front toggle.

The springs S S', attached at or near one end of each to the guides C C', allow the lever-jaws D D' to adjust themselves to the heel-lifts. They force the jaws up to the lifts as the latter are advanced up to the abutment.

The jaws on their inner faces are to be formed to fit to heel-lifts, so as while being closed upon a pack or series of them to force them into their correct relations or positions with each other.

In using the machine, the series of lifts to compose a heel are to be laid on each other in the proper order, and upon the bed-plate and with their front edges against or in the vicinity of the upright inner face of the abutment. Next, the toggles are to be drawn downward, so as to force the head a and the jaws toward the abutment, the springs of the guides causing the jaws in the mean time to clasp and adjust themselves to the lifts.

The part of the bed-plate between the guides I usually "chill harden," in order that it may be able to resist the points of the nails, and cause them to clinch.

I claim as my invention—

The heel-lift holder, substantially as described, composed of the bed-plate A, the abutment B, the guides C C', springs S S', the lever-jaws D D', the head a, the toggles E E', and springs e e, combined and arranged essentially in manner and to operate as and for the purpose specified.

GEORGE V. SCOTT.

Witnesses:
HENRY MORTON, Jr.,
GEORGE STEVENS.